United States Patent [19]

Couvillon et al.

[11] 3,859,609

[45] Jan. 7, 1975

[54] ABSORPTIVE PIN ATTENUATORS

[75] Inventors: James B. Couvillon, Dallas; Roy E. Shipley, Plano, both of Tex.

[73] Assignee: Texas Instruments Incorporated, Dallas, Tex.

[22] Filed: July 23, 1973

[21] Appl. No.: 381,948

[52] U.S. Cl. .............................. 333/81 A, 307/237

[51] Int. Cl. .............................. H01p 1/22

[58] Field of Search .............. 333/81 R, 81 A, 31 R

[56] References Cited

UNITED STATES PATENTS 3,325,754 6/1967 Frisch et al. .................... 333/81 R 3,750,055 7/1973 Funck .............................. 333/31 R 3,775,708 11/1973 Sly .................................. 333/81 A

*Primary Examiner*—Paul L. Gensler

*Attorney, Agent, or Firm*—Harold Levine; Rene' E. Grossman; Alva H. Bandy

[57] ABSTRACT

Variable attenuators for radio frequency (RF) signals in matched impedance transmission line systems are disclosed. Variable absorptive elements, PIN diodes, are used in shunt with the transmission line at quarter wavelength intervals. The impedance of the diodes which are coupled to input and output terminals is made equal at all attenuation levels to the impedance of the remaining diodes plus the characteristic transmission line impedance so that impedance mismatch with external devices is avoided.

8 Claims, 3 Drawing Figures

ABSORPTIVE PIN ATTENUATORS

This invention relates to radio frequency signal attenuators and more particularly to impedance matched attenuators with variable attenuation levels controlled by an electronic signal.

When broadband RF signals in radar or communications systems require attenuation controlled by an electronic signal, elements with RF impedance variable in response to the applied bias current, such as PIN diodes, are commonly used. These elements are placed in series or in shunt or both with the RF signal transmission line, to absorb part of and thereby attenuate the RF signal. See Hewlett-Packard Application Note 58, "The Pin Diode as a Microwave Modulator," August 1967.

Most RF systems require all devices coupled to the transmission line to match the impedance of the transmission line, that is, to have the terminal impedance equal to the characteristic transmission line impedance, Z*o*. An unmatched device will both attenuate, by absorption, and reflect RF signal energy at the junction where the mismatch occurs. The reflections act as undesired signals and generally most be avoided. In addition to matched impedance, minimum phase shift change with attenuation and wide bandwidth are also desirable characteristics of attenuation devices.

The simplest most commonly used attenuator places two PIN diodes in shunt across the transmission line at quarter wavelength spacing. Such a device has matched impedance over only a small part of its attenuation range and has a useful bandwidth limited by the quarter wavelength section.

Impedance match over wide attenuation range may be achieved by use of two quadrature hybrid devices coupled by two of the above described simple attenuators. The Hewlett-Packard 33000A device is an example of this type of attenuator. This technique results in moderate phase shift variation with attenuation level and increased complexity and is still bandwidth limited by the quarter wavelength sections.

A commonly used improvement adds a third quadrature hybrid in place of the quarter wavelength sections, thereby improving the bandwidth, but not the phase shift with attenuation variations, at the cost of even more complexity.

Accordingly, it is an object of the present invention to provide a variable RF attenuator having RF terminal impedances matched over its entire attenuation range to the characteristic transmission line impedance.

Another object of the present invention is to provide a variable RF attenuator having minimum phase shift variation over its operating attenuation range.

Another object of the present invention is to provide a variable RF attenuator having relatively simple structure.

The above and other objects are achieved by providing at least three variable absorptive means in shunt with a transmission line at nominal quarter wavelength intervals. The absorptive means coupled to the ends of the transmission line have an RF impedance equal over the operating attenuation range to that of each of the other absorptive means plus the characteristic impedance of the transmission line.

Other objects, features and advantages of this invention will become better understood by reference to the following detailed description when read in conjunction with the accompanying drawings wherein.

In the following embodiments it is to be understood that the quarter wavelength transmission line segments may be replaced by lumped element equivalents. One lumped element equivalent is the Stienmetz representation of a transmission line described in the text, Kerchner and Corcoran, *Alternating — Current Circuits*, New York; John Wiley & Sons, Inc., Third Edition, 1955, p. 413. The use of such equivalents is advantageous at low frequencies where an actual quarter wavelength transmission line segment would require more space than the lumped element equivalent.

Figure 1:
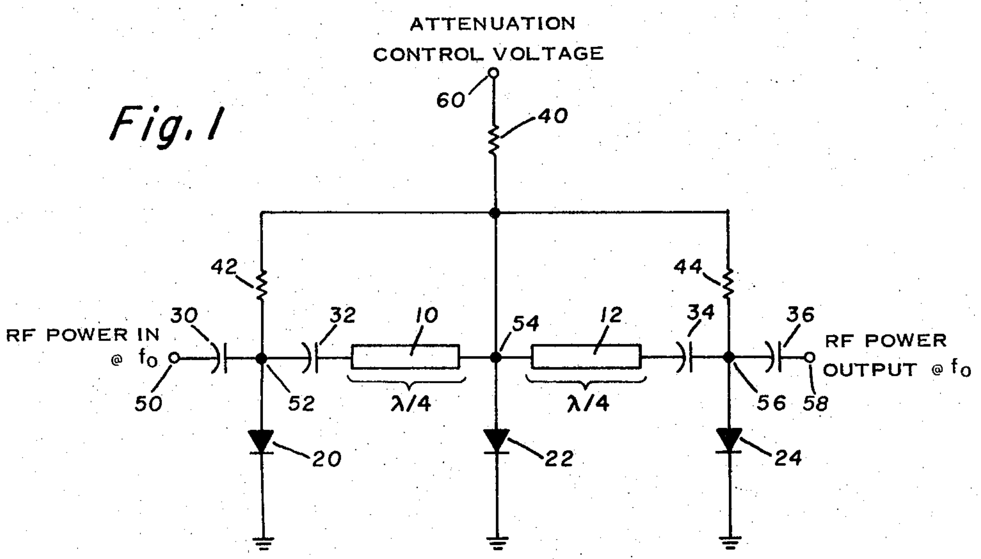
FIG. 1 is a schematic electrical diagram of a variable RF attenuator constituting an embodiment of this invention.

Referring to FIG. 1, the variable absorptive means are PIN diodes 20, 22, and 24. Exemplary of PIN diodes which may be used in all embodiments are Hewlett-Packard 5082-3000 series devices. Unequal bias currents are supplied to the diodes so that the RF impedance of diodes 20 and 24 is substantially equal to the impedance of diode 22 plus Zo over a predetermined operating range of attenuation.

RF signals to be attenuated are applied to input terminal 50 and coupled by capacitor 30 to junction 52 of the anode of PIN diode 20, one plate of capacitor 32, and bias resistor 42. The cathode of PIN diode 20 is coupled to ground. The other plate of capacitor 32 is coupled through quarter wavelength transmission line segment 10 to junction 54 of the anode of PIN diode 22, one end of quarter wavelength transmission line segment 12, and to the junction of bias resistors 40, 42, 44. The cathode of diode 22 is coupled to ground. The other end of bias resistor 40 is coupled to terminal 60 to which an external attenuation control voltage is applied. The other end of transmission line segment 12 is coupled through capacitor 34 to junction 56 of the anode of PIN diode 24, one plate of capacitor 36 and the other end of bias resistor 44. The cathode of diode 24 is coupled to ground. The other plate of capacitor 36 is coupled to output terminal 58.

In operation, the voltage applied to terminal 60 controls the bias current flowing through resistor 40 to PIN diodes 20, 22, and 24. The RF impedance of the diodes decreases with increasing bias current. Bias resistors 42 and 44 limit the current flowing to diodes 20 and 24, respectively, to a level below the current level flowing through diode 22. The capacitors 30, 32, 34, and 36 prevent the bias current flowing to one diode from affecting the current flowing to the others and isolate the bias currents from the RF input and RF output terminals 50 and 58. Proper selection of the values for resistors 40, 42, and 44 will insure that the currents in diodes 20 and 24 will be less than the current in diode 22 by the amount necessary to cause the RF impedance of diodes 20 and 24 to be equal to the RF impedance of diode 22 plus Z*o*. Typical resistance values for this type of attenuator are 500 ohms for resistors 42 and 44, and 1,000 ohms for resistor 40.

With zero bias current the PIN diodes each have a very high RF impedance relative to Z*o* and absorb no signal energy thereby providing substantially no attenuation of RF signal power applied at terminal 50. The impedance at the RF input and RF output terminals 50 and 58 is parallel combination of one end of a transmission line segment and a PIN diode. Since the diode impedance is many times greater than Z*o*, the impedance at each terminal is substantially equal to Z*o*.

At the maximum bias current, diode 22 has substantially zero impedance and short circuits junction 54 to ground. This short circuit causes substantially all RF signal energy reaching junction 54 to be reflected. The short circuit is transformed by reflection through the quarter wavelength transmission line segments 10 and 12 into an open circuit at terminals 50 and 58 respectively.

At this maximum bias current, the RF impedance of diodes 20 and 24 is substantially equal to Z*o*. Since the impedance of transmission line segments 10 and 12 appears as an open circuit at the RF input and RF output terminals, the impedance at the terminals is substantially equal to Z*o*.

Substantially all RF signal energy applied to input terminal 50 is therefore absorbed by PIN diode 20. Substantially all of the small amount of RF energy passing from the input terminal 50 through transmission line segment 10 to junction 54 is reflected back onto segment 10. Thus at maximum bias current, substantially no RF energy passes from the RF input 50 to the RF output 58.

The minimum and maximum attenuation levels are limited by the inherent minimum and maximum impedance values of the PIN diodes. The attenuation level is continuously variable between these limits in response to the bias current level. At all of these intermediate levels the input and output terminal impedances will remain equal to Z*o*.

Figure 2:
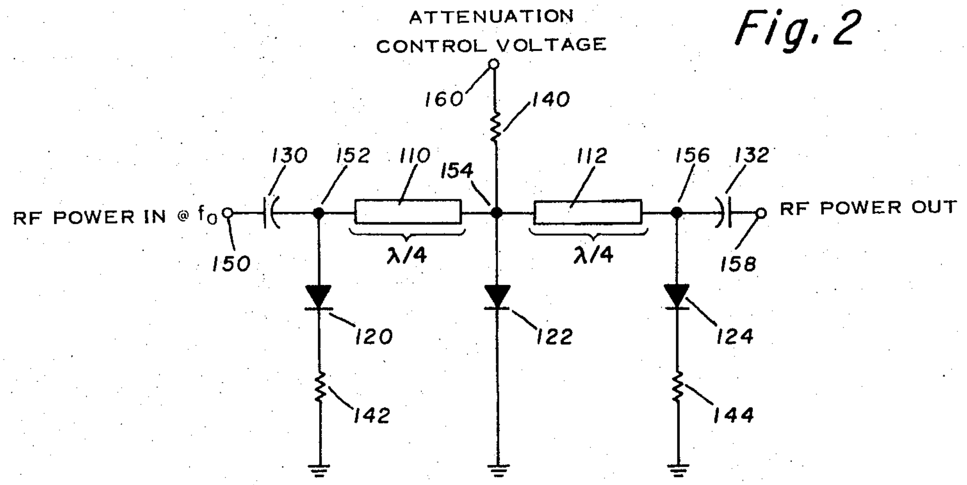
FIG. 2 is a schematic electrical diagram of another embodiment of the invention.

Another embodiment of the present invention is illustrated in FIG. 2. RF signal power is coupled to input terminal 150 which is interconnected with one plate of capacitor 130. The other plate of capacitor 130 is coupled to junction 152 of quarter wavelength transmission line segment 110 and the anode of PIN diode 120. The cathode of PIN diode 120 is coupled through resistor 142 to ground. The other end of transmission line segment 110 is coupled to junction 154 of bias resistor 140, quarter wavelength transmission line segment 112, and anode of PIN diode 122. The cathode of PIN diode 122 is coupled to ground. The other end of the bias resistor 140 is coupled to terminal 160 to which is applied the attenuation control voltage. The other end of transmission line segment 112 is coupled to junction 156 of one plate of capacitor 132 and the anode of PIN diode 124. The cathode of PIN diode 124 is coupled through resistor 144 to ground. Capacitor 132 is coupled to the RF output terminal 158.

In operation the voltage applied to terminal 160 controls the bias current supplied through resistor 140 and the transmission line segments 110, 112 to PIN diodes 120, 122, 124. Capacitors 130 and 132 isolate this current from the input and output terminals 150 and 158, respectively. Substantially equal currents are supplied to all diodes so that diode impedances remain equal at all attenuation levels. Resistors 142 and 144 have impedances equal to Z*o*, and are part of the absorptive means coupled to the RF input and RF output terminals, 150 and 158 respectively. Thus the RF impedance of each absorptive means coupled to the RF input and RF output terminals 150 and 158 is equal to the RF impedance of the absorptive means coupled to junction 154 plus Z*o*.

The diode RF impedance decreases and attenuation increases with increasing bias current. The conditions of input and output impedance match over the operating attenuation range are essentially the same as described for the embodiment of FIG. 1. The only difference is that at maximum bias current level all three diodes 120, 122, 124 have substantially zero impedance, and resistors 142 and 144 are the actual absorptive elements at the RF input and RF output terminals.

Figure 3:
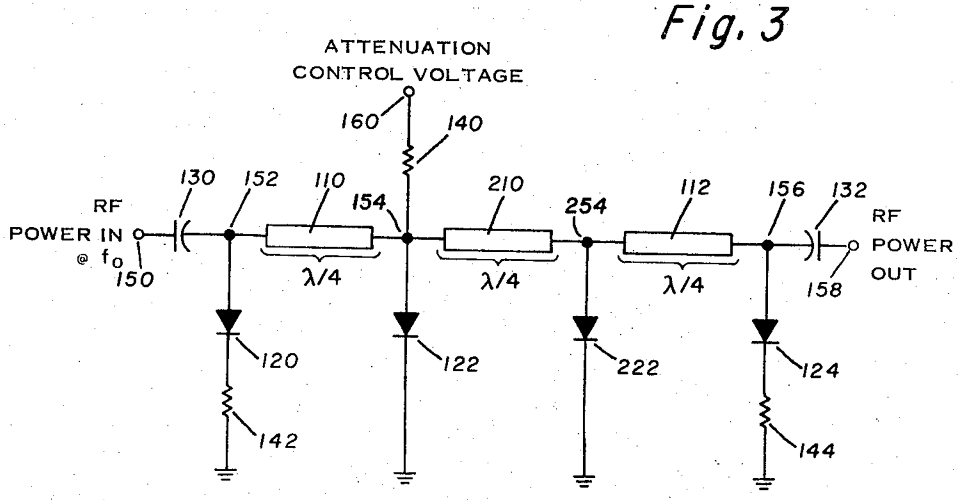
FIG. 3 is a schematic electrical diagram of yet another embodiment of the invention.

A further embodiment of this invention is shown in FIG. 3 which is similar to the embodiment of FIG. 2. This embodiment includes an additional attenuation stage consisting of a quarter wavelength transmission line segment 210, PIN diode 222 and junction 254. The transmission line segment 210 is inserted between junction 154 of transmission line segment 110, bias resistor 140 and anode of PIN diode 122, and junction 254 of the end of transmission line segment 112, which was connected to junction 154 in the embodiment of FIG. 2, and the anode of PIN diode 222. The cathode of diode 222 is connected to ground.

In operation this embodiment is essentially the same as that of FIG. 2 with substantially equal bias currents supplied to all diodes from the attenuation control voltage terminal 160 through resistor 140 and the transmission line segments. The attenuation increases with increasing bias current. The additional diode 222 is used to produce a higher maximum level of attenuation by more closely approximating a short circuit across the transmission line at junctions interior to the RF input and RF output terminals at the maximum bias current level. This effect is due to the small residual impedance of the diodes at high bias current levels, which prevents the diodes from being perfect short circuits. Any number of attenuation stages may be added to achieve greater levels of attenuation. The input and output impedance of this embodiment remain unmatched to Z*o* over the operating attenuation range, as in the other embodiments.

Although the present invention has been shown and illustrated in terms of specific apparatus, it will be apparent that changes or modifications can be made without departing from the spirit and scope of the invention as defined by the appended claims.

What is claimed is:

1. An absorptive attenuator for RF signals in matched impedance systems comprising:

a plurality of transmission line segments, each having a length of one quarter wavelength at a preselected operating center frequency, said segments coupled between an RF input terminal and an RF output terminal for conducting RF energy from the RF input to the RF output, a plurality of PIN diodes coupled in shunt to the RF input and RF output terminals and junctions of transmission line segments for selectively absorbing part of the RF energy conducted by said transmission line segments, and a bias network for supplying unequal bias currents to said diodes to maintain the RF impedance of said diodes coupled to the RF input and RF output terminals at a value substantially equal to that of said diodes coupled to a common junction of transmission line segments plus the transmission line characteristic impedance over an operating range of attenuation levels.

2. An absorptive attenuator for attenuating RF signals between an input and an output terminal comprising, first and second transmission line segments each having a length of one quarter wavelengths at a preselected operating center frequency and each having one end coupled to a junction, a plurality of variable absorptive means, one side of a first absorptive means coupled to said input terminal and the other end of said first line segment, one side of a second absorptive means coupled to said output terminal and the other end of said second line segment, and a third absorptive means coupled in shunt to said junction, and, a bias network coupled to said junction for supplying current to said absorptive means which is related to the desired attenuation level of said RF signals, said bias network including resistors coupled between said junction and said input terminal and output terminal.

3. An attenuator according to claim 2 further including a plurality of capacitors coupled in series with the input and output terminals.

4. An absorptive attenuator for attenuating RF signals between an input terminal and an output terminal comprising:

first and second transmission line segments each having a length of one quarter wavelength at a preselected operating center frequency and each having one end coupled to a junction, first and second variable absorptive means each comprising a PIN diode in series with a resistor having an impedance value equal to the transmission line characteristic impedance value, said first absorptive means coupled to said input terminal and the other end of said first line segment, and said second absorptive means coupled to said output terminal and the other end of said second line segment, third variable absorptive means comprising a PIN diode coupled to said junction, and attenuation control means for supplying substantially equal currents to all diodes in proportion to a desired attenuation level.

5. An attenuator according to claim 4 further including at least one additional attenuation stage comprising a quarter wavelength transmission line segment and a PIN diode interposed between said first and second segments.

6. An absorptive attenuator for attenuating RF signals between an input and an output terminal comprising, first and second transmission line segments, each having a length of one quarter wavelength at a preselected operating center frequency and each having one end coupled to a junction, a plurality of variable absorptive means, one side of a first absorptive means coupled to said input terminal and the other side of said first line segment, one side of a second absorptive means coupled to said output terminal and the other side of said second line segment, and a third absorptive means coupled in shunt to said junction, control means coupled to said junction for supplying current to said absorptive means in proportion to a desired attenuation level of RF signals, and impedance adjusting means coupled to said absorptive means for maintaining the RF impedance value of said first and second absorptive means equal to the RF impedance value of said third absorptive means plus the transmission line characteristic impedance.

7. An attenuator according to claim 6 wherein said absorptive means are PIN diodes.

8. An attenuator according to claim 7 wherein said control means and said impedance adjusting means is a bias network coupled to said junction and to said input and output terminals.

* * * * *

UNITED STATES PATENT OFFICE
CERTIFICATE OF CORRECTION

Patent No. 3,859,609 Dated January 7, 1975

Inventor(s) James B. Couvillon and Roy E. Shipley

It is certified that error appears in the above-identified patent and that said Letters Patent are hereby corrected as shown below:

Column 1, line 23, "most" should read --must--. Column 3, line 1, after "is" insert --the--. Column 4, line 38, "unmatched" should read --matched--.

Signed and sealed this 11th day of March 1975.

(SEAL)
Attest:

RUTH C. MASON
Attesting Officer

C. MARSHALL DANN
Commissioner of Patents
and Trademarks

RM PO-1050 (10-69)

USCOMM-DC 60376-P69
☆ U.S. GOVERNMENT PRINTING OFFICE : 1969 O—366-334.